United States Patent [19]

Schuster et al.

[11] Patent Number: 5,124,524
[45] Date of Patent: Jun. 23, 1992

[54] LASER ALIGNMENT AND CONTROL SYSTEM

[75] Inventors: Charles M. Schuster, Shorewood; Michael C. Marshall, Savage; Alan D. Langerud, Plymouth, all of Minn.

[73] Assignee: Laser Design Inc., Minneapolis, Minn.

[21] Appl. No.: 614,376

[22] Filed: Nov. 15, 1990

[51] Int. Cl.⁵ .......................................... B23K 26/02
[52] U.S. Cl. ........................ 219/121.78; 219/121.82
[58] Field of Search ............. 364/474.37; 219/121.78, 219/121.79, 121.82

[56] References Cited

U.S. PATENT DOCUMENTS 4,808,791  2/1989  Puozzo et al. ................. 219/121.78
4,977,512  12/1990  Nakagawa ................. 364/474.37 X

FOREIGN PATENT DOCUMENTS 0048694  2/1989  Japan ............................... 219/121.78
1-228693  9/1989  Japan .

Primary Examiner—C. L. Albritton
Attorney, Agent, or Firm—Haugen and Nikolai

[57] ABSTRACT

A laser alignment system includes a probe head assembly mounted for linear articulation in mutually perpendicular X, Y and Z axes, with respect to a reference plane. In a four axis version of the system, a laser probe is further mounted for rotation about a V axis relate to the reference plane. Adjustment means are provided to ensure that a laser beam emitted by the probe is perpendicular to the V axis and intersects the V axis. In a five axis version of the system, the laser probe is further rotatable about a W axis perpendicular to the reference plane. This version further incorporates a means to translate the laser beam so that the beam, when perpendicular to the reference plane, coincides with the W axis.

17 Claims, 6 Drawing Sheets

LASER ALIGNMENT AND CONTROL SYSTEM

BACKGROUND OF THE INVENTION

The present invention relates to three dimensional digital mapping, and more particularly to devices for controllably directing laser energy upon objects in the course of mapping surface contours of the objects.

Three dimensional laser digitizing is known as an effective technique for collecting information about the surface contours of an object under study Typically a laser beam is directed onto the surface of the object Reflected light is measured to obtain information about the surface contours The information is translated to digital information, from which a wire-frame image of the object can be projected onto a video display terminal. Three dimensional laser digitizing affords substantial advantages over earlier topography measurement schemes involving a contact probe or stylus Laser digitizing involves no contact with the object being measured, and enables surface measurement of soft and fragile objects (e.g. models of clay or flexible foam) without the possibility of damaging the object or distorting the surface Laser systems also afford higher resolution and accuracy, and require no offset calculations.

One of the more challenging aspects in laser digitizing concerns objects with complex, irregular surface topographies. Some point-range laser probes are capable of precision measurement even when the laser beam is substantially offset from perpendicular to the surface under scan. Nonetheless, imaging is enhanced and digital data more reliable, when the laser beam can be positioned approximately perpendicular to such surface. Moreover, it is highly desired to perform scanning automatically and "on the fly", which requires precise rotation and precise translation of the laser probe, to minimize the chance for erroneous topography information due to movement of the laser probe.

Therefore, it is an object of the present invention to provide a means for accurately positioning and translating a laser probe to controllably position and orient a laser beam relative to the surface contours of a scanned object.

Another object of the invention is to provide a means for positioning a laser beam parallel to any vector in a two dimensional space, based on three mutually perpendicular linear translation axes and one rotational axis.

It is a more particular object of the invention to provide a means for positioning a laser beam parallel to any vector in three dimensional space, based on three mutually perpendicular axes of linear translation and two distinct rotational axes.

Yet another object of the present invention is to provide a laser support head adapted for mounting to a precision machining apparatus, with at least one rotational axis and means for precision aligning each rotational axis relative to the machining system.

SUMMARY OF THE INVENTION

To achieve these and other objects, there is provided an apparatus for supporting the laser for controlled translation and rotation. The apparatus includes a stationary base having a reference surface that defines a reference plane. Means are provided for mounting a rigid support member for linear translation in mutually perpendicular first, second and third directions. The first and second directions are parallel to the reference surface and the third direction is perpendicular to the reference surface. A laser mounting means adjustably secures a laser energy source with respect to the rigid support member. The laser mounting means includes a rigid support means integral with the laser energy source, a rigid first frame means, and a first coupling means for joining the support means to the first frame means for pivotal movement relative to the first frame means on a first adjustment axis parallel to the reference plane, and for linear translation relative to the first frame means along the first adjustment axis. A first adjustment means adjustably fixes the linear position of the support means relative to the first frame means, and a second adjustment means adjustably fixes the angular position of the support means relative to the first frame means. The laser mounting means further includes a second, coupling means for joining the first frame means for rotation relative to the support member about a first rotational axis parallel to the reference plane. The apparatus further includes a first drive means for controllably moving the support member in the first, second and third directions, and a second drive means for rotating the first frame means relative to the support member.

Preferably, the first rotation axis is perpendicular to the first adjustment axis. In one version of the apparatus, the first frame means includes a substantially flat support plate having a major plane at least approximately perpendicular to the first rotational axis. The support means includes a substantially flat pivot plate spaced apart from the support plate in the direction of the first rotational axis and at least approximately parallel to the support plate. The coupling means can include a pair first channels in the support plate, elongate and spaced apart from one another in the direction of the first adjustment axis, a pair of hemispherical second channels, each opposed to one of the first channels, a spherical bearing contained in each opposed pair of channels, and a biasing means such as a spring in tension joined to the support plate and pivot plate to bias the plates toward one another and thus retain the bearings. A rod, threadedly engaged within the pivot plate and engaged with the support plate, is rotatable to move the pivot plate linearly relative to the support plate, to provide the first adjustment means. A second adjustment means likewise can include a threaded member engaged within the pivot plate. In this case, the threaded member extends in the direction of the first rotational axis and engages the support plate, with a spring means biasing the pivot plate and support plate angularly towards one another.

The coupling means and adjustment means enable a precision alignment of the laser source with respect to the reference plane. More particularly, the support means supporting the laser can be aligned to position the laser beam angularly to be perpendicular to the first rotational axis, and further aligned to linearly position the laser beam so that it intersects the first rotational axis. As a result, fully automated scanning of an object is achieved, with the object either held stationary or rotated about a reference axis in a known disposition relative to the reference plane. The laser probe is movable linearly throughout a three dimensional space, and further can be rotated about the first rotational axis to position the laser beam parallel to any vector in a two dimensional space. Regardless of the laser probe position or angular orientation, the beam intersects and remains perpendicular to the first rotational axis.

In another embodiment, the laser mounting means further includes a third coupling means for joining the first frame means to the support member for linear translation, relative to the support member, along a second adjustment axis parallel to the reference plane and angularly offset from (preferably perpendicular to) the first adjustment axis. A fourth coupling means joins the first frame means for rotation relative to the support member about a second rotational axis perpendicular to the reference plane. A third drive means is provided to rotate the first frame means about the second rotational axis. Also, a third adjustment means adjustably fixes the linear position of the first frame means relative to the support member along the second adjustment axis.

With this arrangement, the support means is again adjustably positioned so that the laser beam is perpendicular to and intersects the first rotational axis. Further, however, the beam is translated linearly to coincide with the second rotational axis. Accordingly, the beam remains perpendicular to the first rotation axis and coincident with the second rotation axis regardless of the location or angular orientation of the laser probe. This enables an automatic scan in which the laser beam can be positioned parallel to any vector in a three dimensional space.

In the case of either embodiment, the present invention affords a substantial advantage in that the laser beam can be appropriately positioned and oriented with respect to virtually any point on the surface of any object, regardless of convolutions, irregularities and other complexities in the topography of the object. The enhanced laser positioning affords more accurate and reliable data representing the topography, leading to more accurate replication of the object in a scan-line pattern.

IN THE DRAWINGS

For further understanding of the above and other features and advantages, reference is made to the following detailed description and to the drawings, in which.

Figure 1:
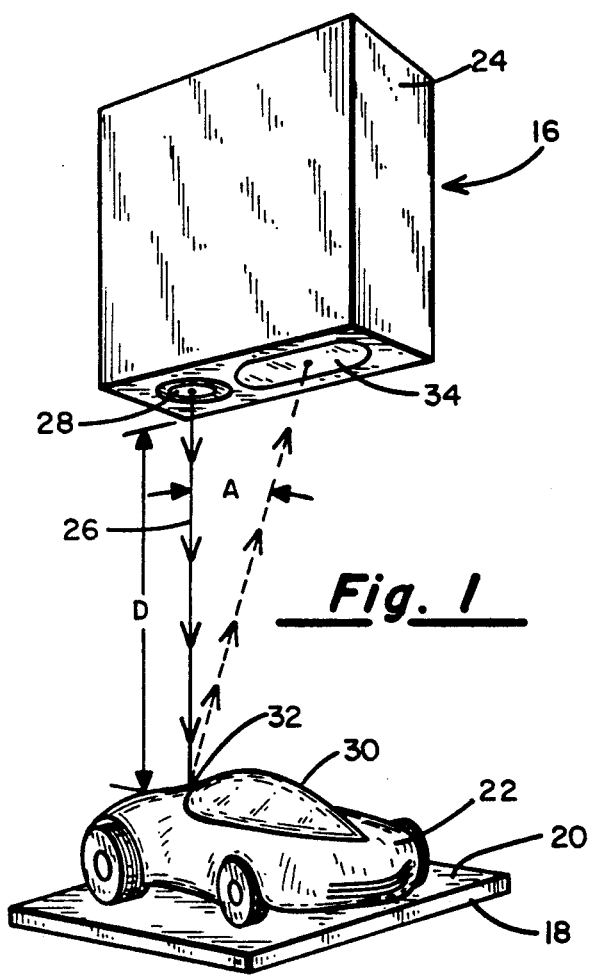
FIG. 1 is a schematic view of a laser probe scanning the surface of an object in a three dimensional digitizing process.

Turning now to the drawings, there is shown in FIG. 1 a laser camera or laser probe 16 supported in spaced apart relation to a base 18 having a planar, horizontal reference surface 20. An object 22 is at rest on the reference surface. Laser probe 16 includes a casing 24 surrounding a source of laser energy. A laser beam 26, produced by the laser source, is emitted beyond the housing through a laser source aperture 28, and onto the exposed exterior surface 30 of object 22 at a point or region 32, from which the beam is reflected back to the probe through a receiving aperture 34. Any change in the distance D between probe 16 and surface 30 is determined by triangulation, based on a corresponding change in the angle A between laser beam 26 and the reflected beam. The reflected beam is received at aperture 34 and projected as a point onto a detector (not shown). Probe 16 is movable longitudinally and transversely of object 22, and information is acquired based on thousands of points such as point 32. In a known manner not further discussed in this application, information from these multiple points is converted to digital information based on three dimensional coordinates, and then can be used to create a scan-line pattern that replicates the surface contours or topography of the object under scan.

When the entire exterior surface of object 22 must be mapped, it is necessary to rotate the object to various distinct positions about an axis parallel to the reference surface, e.g. a longitudinal axis of the object. This eventually exposes the entire surface 30 to scanning, in spite of the fact that laser beam 26 remains vertical. A satisfactory scan is obtained for objects with smooth surfaces having virtually no irregularities and not subject to damage or distortion from the handling involved in the repeated rotation.

Figure 2:
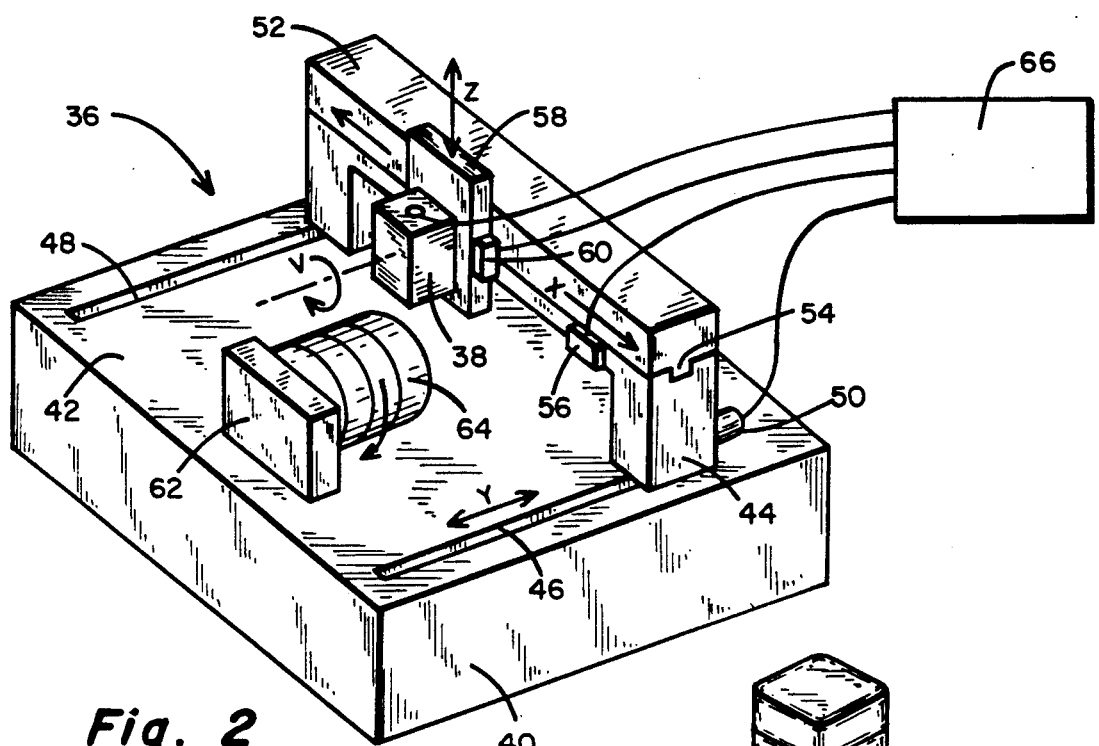
FIG. 2 is a schematic view of an apparatus for supporting a laser probe and an object for scanning, in accordance with the present invention.

For three dimensional scanning of fragile or deformable objects, there is a substantial risk that handling the object during scanning will either temporarily deform the object or cause permanent damage in either case distorting the scan line representation of surface topography. Further, tolerances involved in rotating the object can detract from the scanning accuracy. Accordingly, FIG. 2 shows a three dimensional digitizing system 36 in which a laser probe head assembly 38 is supported for a linear translation along three mutually perpendicular axes including a horizontal X axis, a horizontal Y axis and a vertical Z axis. Probe assembly 38 further rotates a laser probe about a V axis, preferably parallel to the Y axis.

System 36 includes a rigid base 40 having a planar, horizontal surface 42 which forms a reference plane. A first support stage 44 is supported on the base for movement in the Y direction along a pair of opposed, parallel tracks 46 and 48, controlled by a servo motor 50. A second support stage 52 is supported on the first support stage, for movement in the X direction relative to the first stage along a track 54 formed in the first stage. A servo motor 56 controls movement of the second support stage. A third support stage 58 is mounted on the second support stage, for movement in the Z direction relative to the second support stage, as controlled by a servo motor 60. Third stage 58 is a support member movable in the X, Y and Z directions relative to base 40, as controlled by servo motors 50, 56 and 60.

A stand 62 is mounted upon base 40, to support an object 64 for scanning. If desired, stand 62 can include a rotary stage for rotating the object about an axis B, parallel to the V axis and Y axis. However, it is to be understood that as compared to the approach described in connection with FIG. 1, system 2 facilitates complete scanning with minimal need to rotate or otherwise move the object being scanned. This is an advantage especially when the object being scanned is either elastically deformable or fragile, as scanning can be accomplished entirely through movement of the laser probe, while maintaining the object stationary.

A computer 66 (e.g. an IBM PC AT) controls servo motors 50, 56, 60 and a rotary drive that rotates the laser probe about the V axis relative to support member 58. Computer 66 receives information on the angular position of the laser probe, the linear position of third stage 58 relative to second stage 52, the linear position of second stage 52 with respect to first stage 44 and the position of first stage 44 along base 40, all of which is converted into an absolute, three dimensional coordinate representation of the location and orientation of the laser probe. Computer 66 generates servo signals which drive motors 50, 56, 60 and the rotary drive, and in turn, based on the probe location and orientation signal received, alters the various servo signals in accordance with a scanning program, for completely automatic topography scanning.

Figure 3:
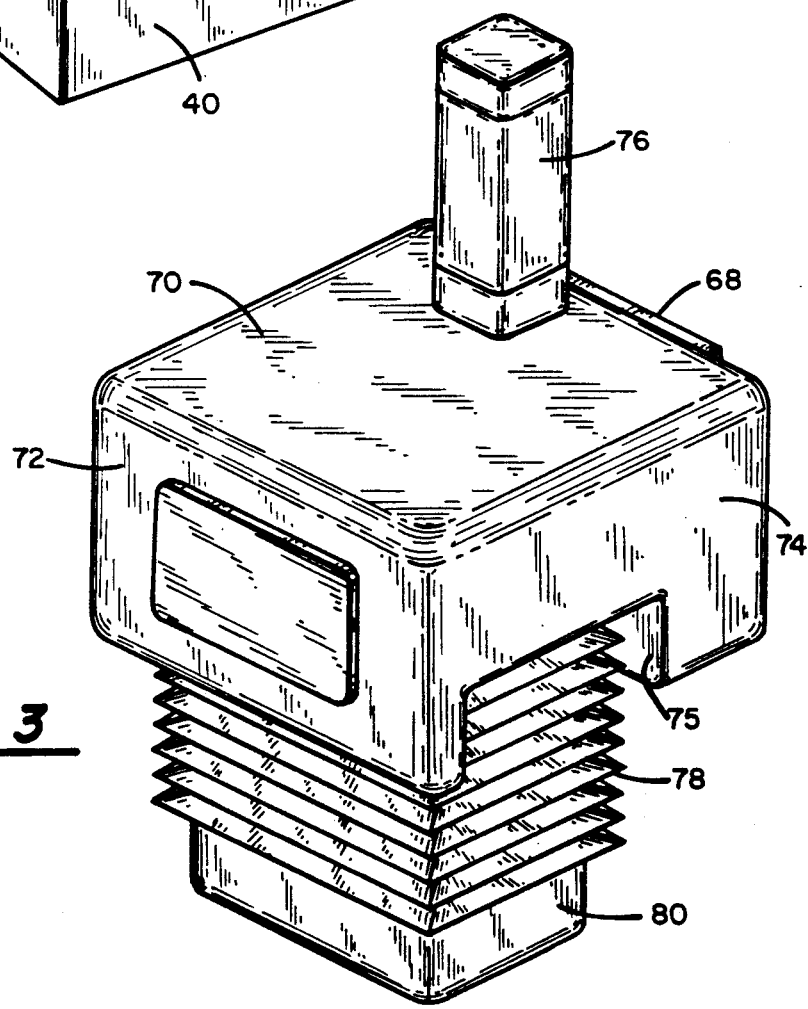
FIG. 3 is a prospective view of the probe assembly of FIG. 2.

Laser probe head assembly 38 is shown in FIG. 3. The head assembly includes a back plate 68 integrally secured to support member 58 whereby the probe head is linearly translated along the X, Y and Z axes with the support member. A rigid shroud 70 forms a protective enclosure surrounding the laser probe, and includes a forward wall 72, a rear wall secured to back plate 68, and two opposed side walls, one of which is shown at 74. Notches are formed in the side walls, as indicated at 75, to accommodate angular travel of the laser probe. The rotary drive includes a servo motor 76 that extends upwardly beyond the shroud. Bellows 78 extend downwardly of the shroud, and a sheet metal cage 80 at the bottom of the bellows, protects the laser probe from below.

Figure 4:
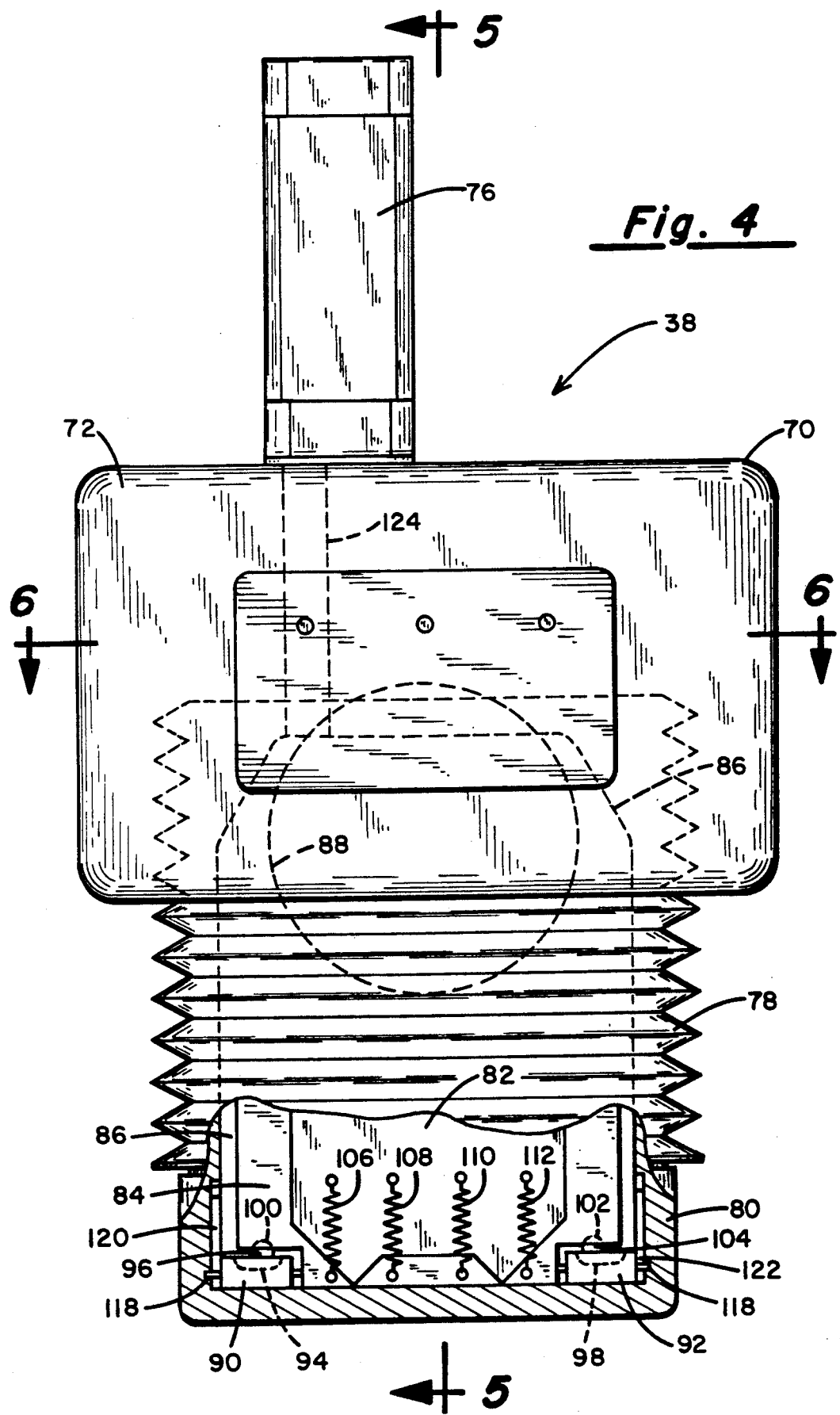
FIG. 4 is a forward elevation of the probe assembly.
Figure 5:
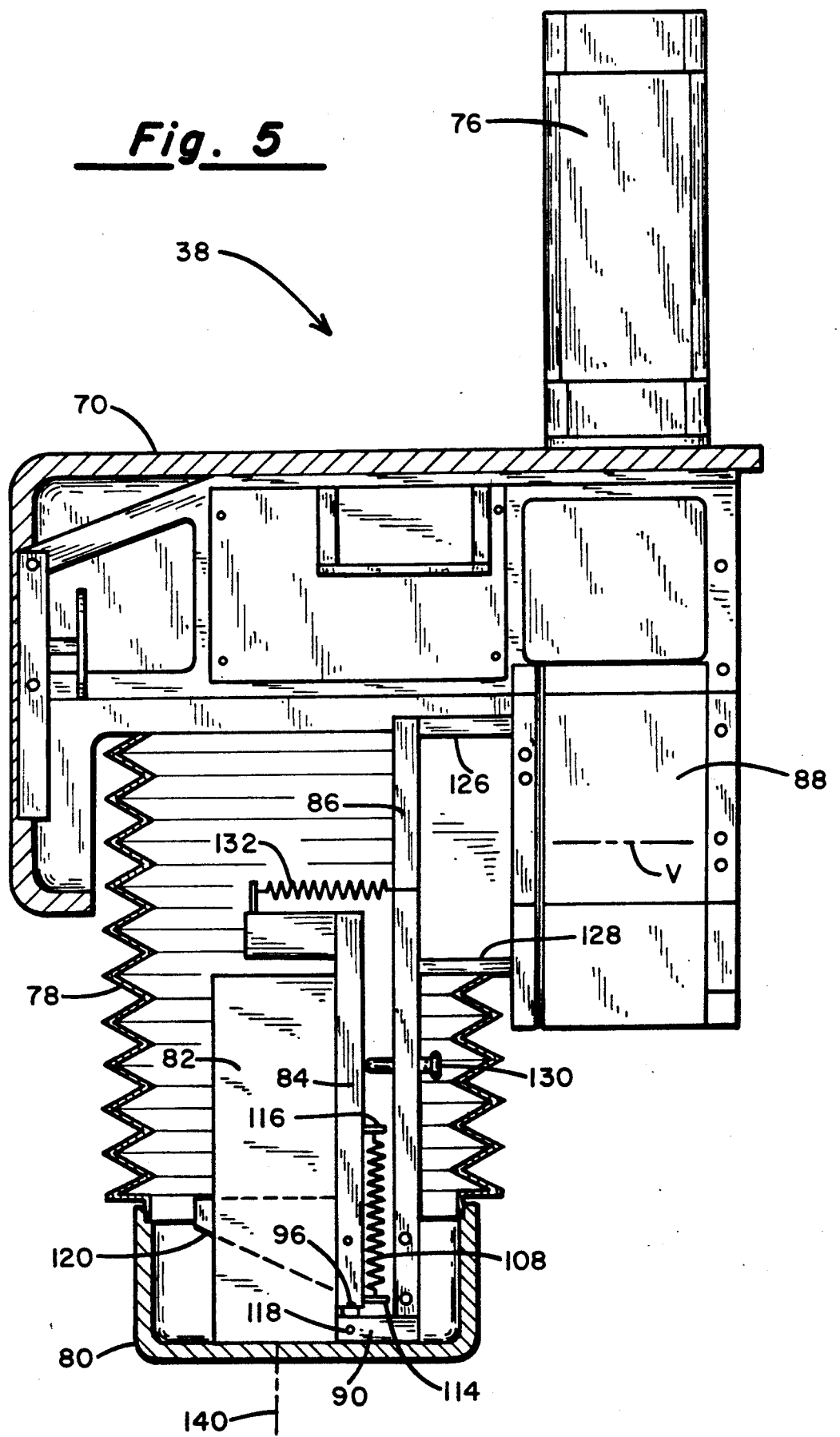
FIG. 5 is sectional view taken along the line 5—5 in FIG. 4.
Figure 6:
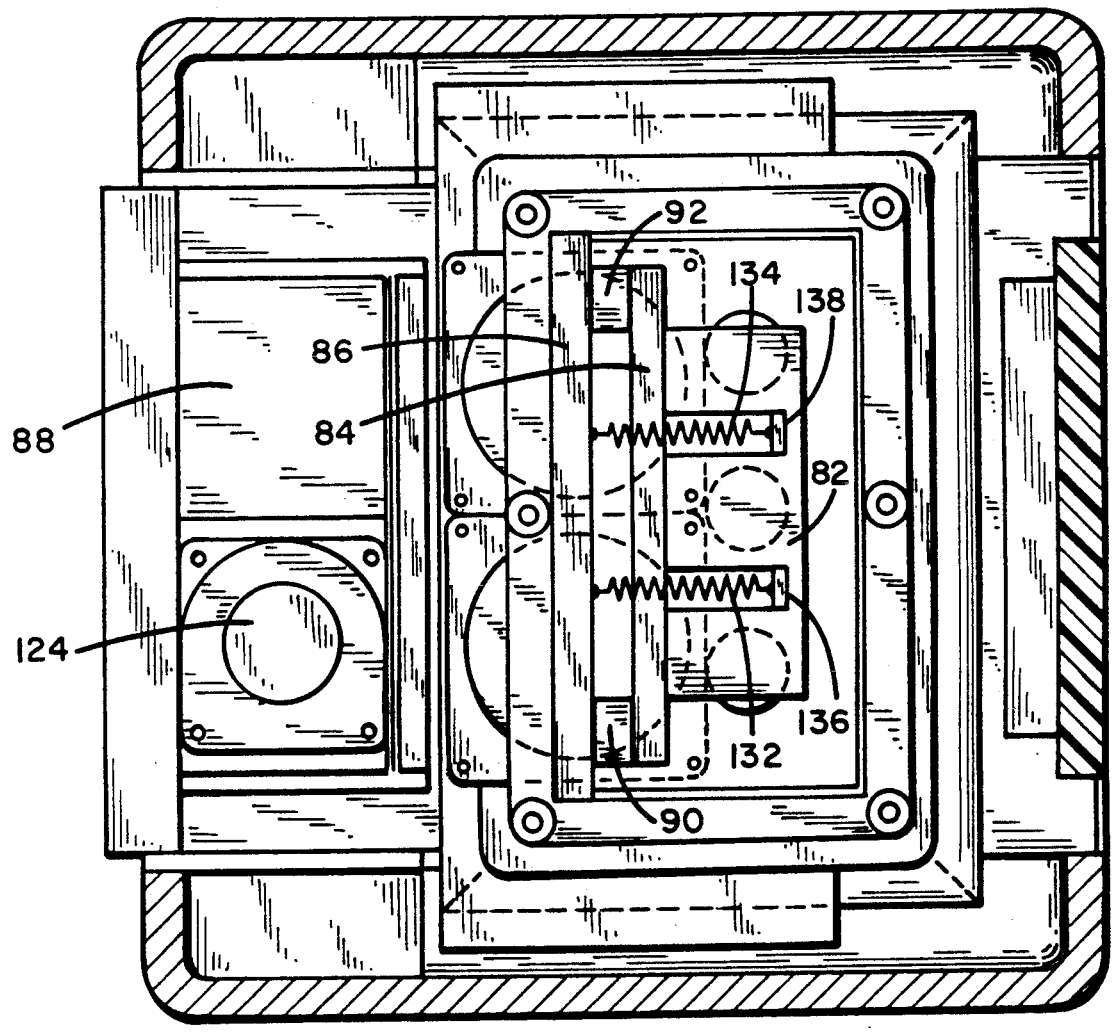
FIG. 6 is a sectional view taken along the line 6—6 in Figure.

FIGS. 4, 5 and 6 illustrate certain features of head assembly 38 surrounded by shroud 70 and bellows 78. More particularly, in FIG. 4 portions of the bellows and cage 80 are removed to reveal a laser probe 82, a laser mount plate or pivot plate 84 integrally secured to and supporting the laser probe, and a main plate or support plate 86. The main plate is secured to a rotor 88, for rotation about the V axis.

Laser mount plate 84 is supported for horizontal movement relative to main plate 86, i.e. to the left and right as viewed in FIG. 4. More particularly, a pair of blocks 90 and 92 are fixed to opposite ends of main plate 86 at the bottom, and extend toward laser mount plate 84. A channel 94 in block 90 is open to receive a spherical bearing 96. Channel 94 conforms to the bearing in the sense that its width is approximately equal to the bearing diameter. Channel 90 also is elongate in the direction of the width of plates 84 and 86 (i.e. along a U axis). A similar channel 98 is formed in block 92 and aligned with channel 94. Channels 100 and 102 formed at opposite ends of mount plate 84, are substantially hemispherical to accommodate bearings 96 and 104, respectively. Springs 106, 108, 110 and 112, each connected to main plate 86 and laser mount plate 84 (as indicated at 114 and 116 for spring 108), continually urge the laser mount plate downwardly toward blocks 90 and 92. Thus spherical bearings 96 and 104 remain captured in their pairs of opposing channel/grooves. These bearings move relative to the channels and grooves to: (1) define the U axis about which laser mount plate 84 pivots relative to main plate 86; and (2) allow linear travel of mount plate 84 with respect to main plate 86, by the travel of each bearing along and within its associated channel.

The linear position of the mount plate relative to the main plate is controlled by an elongate rod 118 in the mount plate, in combination with brackets 120 and 122 fixed to opposite sides of main plate 86. Rod 118 is threadedly engaged with the laser mount plate, and its opposite ends are engaged with the brackets. Thus, when the rod is rotated, it causes the mount plate to travel laterally relative to main plate 86, i.e. to the left and right as viewed in FIG. 4. The amount of lateral travel is limited, but sufficient for the required adjustment to be explained.

Rotary drive servo motor 76 rotates a drive shaft 124 indicated by broken lines in FIG. 4. Shaft 124 is driveably engaged with rotor (rotary stage) 88, e.g. in worm gear fashion, so that the rotary stage rotates about the V axis responsive to drive shaft rotation.

In FIG. 5 it is seen that upper and lower stand-off members 126 and 128 support main plate 86 spaced apart in the Y direction from a forward face of rotary stage 88. Similarly, laser mount plate 84 is spaced apart in the Y direction from the main plate, by virtue of blocks 90 and 92. The tilt of plate 84 with respect to plate 86, about the U axis defined by bearings 96 and 104 is controlled by a pin 130 and a pair of springs 132 and 134 (FIG. 6) in tension. More particularly, pin 130 extends through and is threadedly engaged within main plate 86. The forward end of the pin engages laser mount plate 84. Spring 132 is secured at one end to the main plate, and at the other end to an arm 136 extended forwardly of the mount plate. Spring 134 is similarly coupled to the main plate and an arm 138, and cooperates with spring 136 to continually urge mount plate 84 toward the main plate, i.e. in the clockwise direction as viewed in FIG. 5. Thus, pin 130, when rotated within the main plate, adjusts the relative tilt of the mount plate, as well as the tilt of laser probe 82 and a laser beam indicated at 140.

Prior to using the system for scanning, laser beam 140 must be properly positioned and oriented with respect to the X, Y and Z axes. The initial alignment step involves ensuring that the V axis, i.e. the rotational axis of rotor 88, is parallel to the reference plane. To this end, a dial indicator is used to ensure that the forward face of the rotor is vertical, in particular parallel to the vertical face of support member 58.

Figure 7:
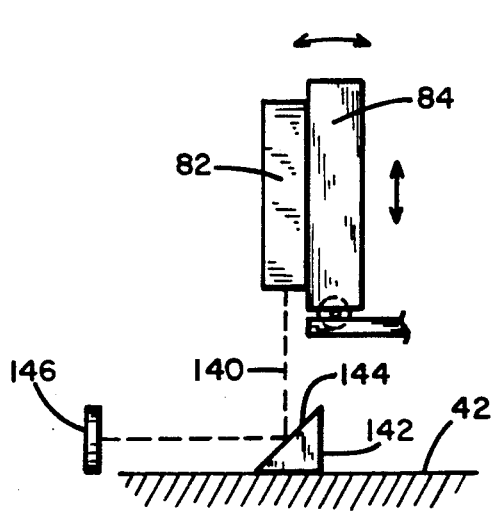
FIGS. 7 and 8 are schematic representations of aligning the first embodiment probe assembly.

Next, the angle of laser beam 140 is adjusted to ensure that the beam is perpendicular to reference surface 42. This involves pivoting the beam about two perpendicular axes, the U axis defined by the bearings, indicated in FIG. 7, and the V axis or rotational axis of rotor 88, indicated in FIG. 8. In each case, an angle block 142 having an inclined surface 144 at a 45 degree angle to reference surface 42, is positioned to reflect beam 140 to a scale 146, while servo motor 60 is actuated to move the probe head assembly vertically. If beam 140 is truly vertical or perpendicular to the reference surface, the position of the reflected beam upon scale 146 remains constant. Otherwise, the beam either rises or descends, and it is necessary to either adjust pin 130 (FIG. 7) or to actuate servo motor 76 to adjust the rotary stage (FIG. 8).

Once beam 140 is determined to be vertical, it is necessary to ensure that the beam is centered on the rotary stage, i.e. that the beam intersects rotation axis V. This involves rotating rotary station 88 in known increments (e.g. 5 degrees, 10 degrees, 15 degrees, etc.) of off-set from the vertical, and readings are taken along reference surface 42. If mount plate 84 is properly aligned such that beam 140 intersects rotation axis V, then corresponding readings (+5°−5°, +10°−10°, etc.) are equal. Otherwise, rod 118 is rotated to adjust the laser mount plate.

Figure 8:
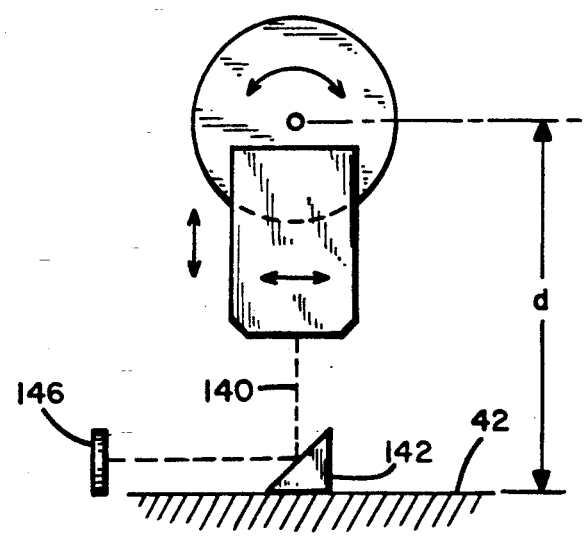

Finally the distance of rotation axis V from reference surface 42, indicated as d in FIG. 8, is determined based on the readings along reference surface 42, once corresponding readings are equal, based on the fact that oppositely off-set pairs of readings represent the sine of a known angle times the beam length, and distance d represents this same length times the co-sine of the angle.

With these adjustments complete, probe head assembly 38 is aligned with reference surface 42 in the sense that rotation axis V is parallel to the reference surface, and also that beam 140, when rotating with rotor 88, rotates in an XZ plane, i.e. perpendicular to the Y axis as well as the V axis. Beam 140 intersects the V axis, ensuring that there is no off-set in the beam, regardless of its angle relative to the reference surface as determined by rotary stage 88.

Servo motor 76, through rotor 88, can position laser beam 140 parallel to any vector in an XZ plane, while servo motors 50, 56 and 60 can position the beam anywhere within a predetermined three dimensional volume.

Figure 9:
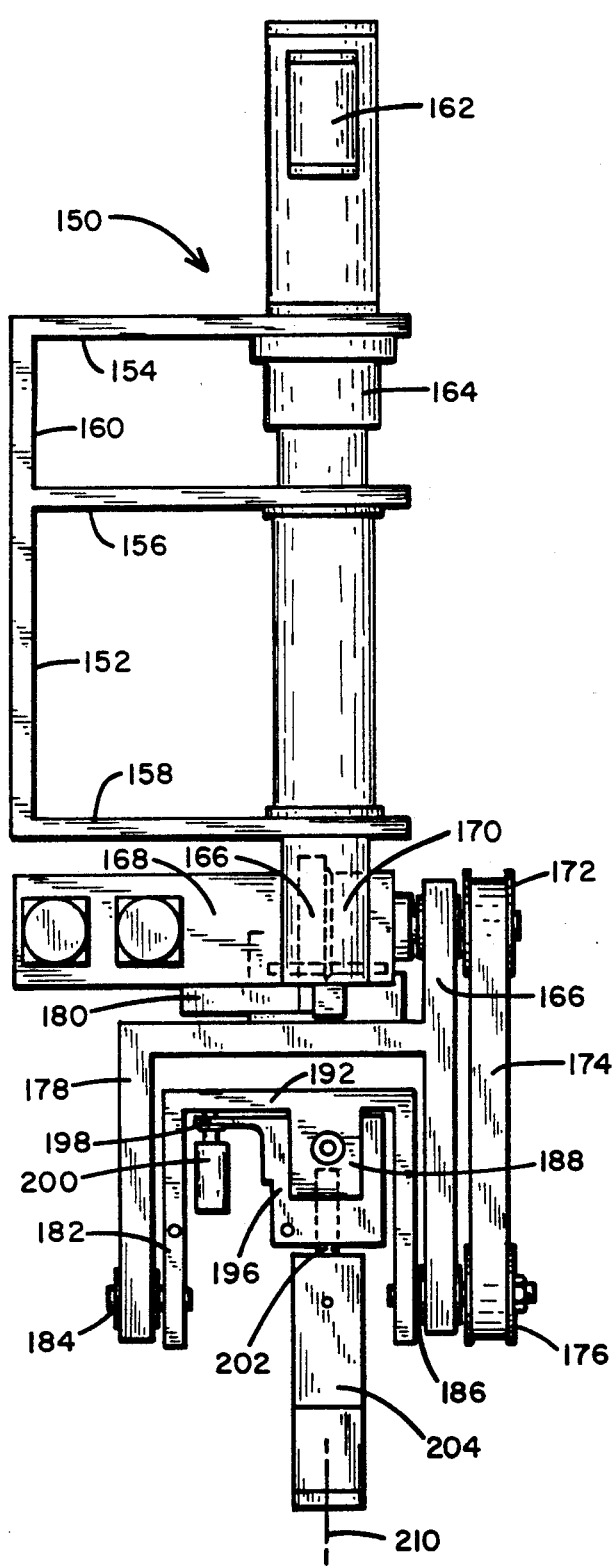
FIG. 9 is a side elevation of a second embodiment head assembly constructed in accordance with the present invention.
Figure 10:
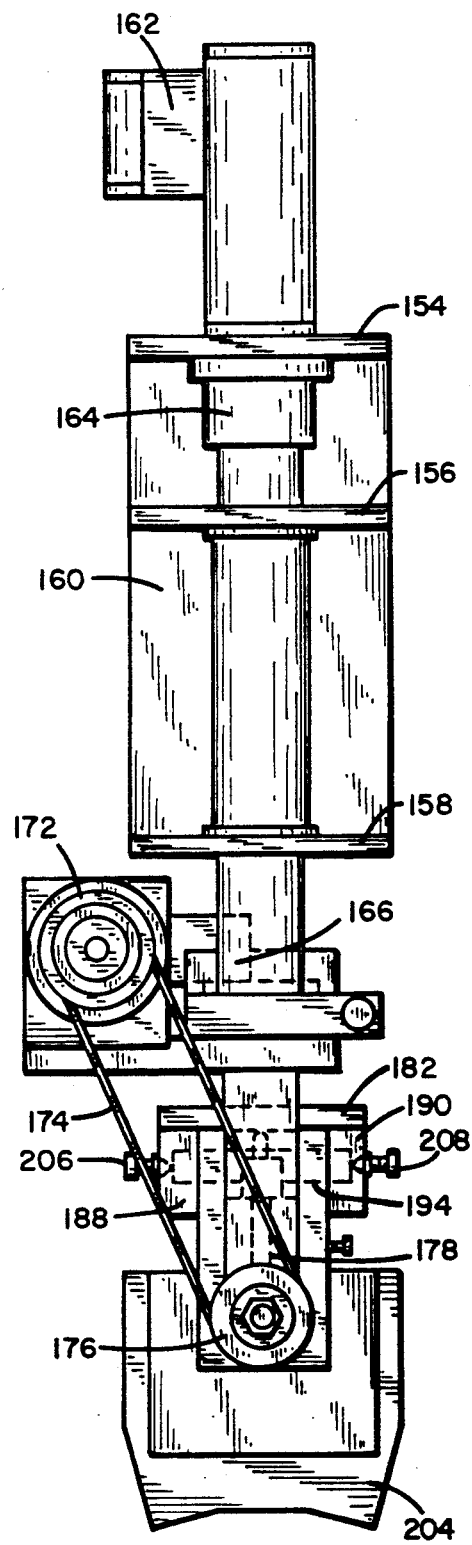
FIG. 10 is a front elevation of the probe assembly of FIG. 9.

While this arrangement is satisfactory for many scanning applications, objects with irregular or complex surface topographies raise the need for laser beam orientations that require either moving the object under scan or orienting the laser beam out of the XY plane. To this end, a five axis probe head assembly 150 is shown in FIGS. 9 and 10. The probe head assembly includes a frame 152 including three horizontal extensions 154, 156 and 158 and a vertical extension 160, which can be secured to support member 58, much in the manner of backplate 68 of probe head assembly 38.

Mounted in a columnar portion of probe head assembly 150 are a servo motor 162 and a harmonic drive 164, which rotate the remainder of the probe head assembly about a W axis relative to the support frame. The W axis is perpendicular to the reference plane.

The rotating portion of the head assembly includes an upper frame 166 carrying a servo motor 168 and a harmonic drive 170 which rotate an upper pulley 172 about a V axis. A belt 174 driveably engages a lower pulley 176 with the upper pulley, for rotation about the V axis as the upper pulley is rotated.

An inverted U-shaped frame 178 is mounted to slide with respect to upper frame 166, in the direction of the V axis or to the left and right as viewed in FIG. 9. A micrometer barrel 180 adjustably fixes the linear position of frame 178 relative to frame 166.

A second inverted U-shaped frame 182 is pivotally mounted to frame 178 through shafts 184 and 186. Accordingly, servo motor 168 and harmonic drive 170 are operable to rotate frame 182 relative to frame 178 about the V axis.

A pair of opposed lobes 188 and 190 extend downwardly from an upper horizontal part 192 of frame 182. An elongate cylinder 194 (FIG. 10) is mounted rotatably and slidably relative to frame 182, with its opposite ends captured in lobes 188 and 190. Cylinder 194 supports a block 196, the block and cylinder both being rotatable about the U axis relative to frame 182. A ledge 198 extends from block 196 in a direction parallel to the V axis. A micrometer barrel 200, including a portion extended through ledge 198 and abutting U-shaped frame 182, controllably adjusts the tilt or angular location of block 196 relative to frame 182.

A column 202 supports a laser probe 204 and is mounted in block 196. Thus, the probe is integral with the block, and its angular position relative to inverted U-shaped frame 182 is determined by micrometer barrel 200. Opposed pins 206 and 208, threadedly engaged in lobes 188 and 190 respectively, engage the opposite ends of cylinder 194. Pins 206 and 208, when rotated, controllably adjust the position of cylinder 194 (and thus laser probe 204) relative to frame 182 along the U axis.

Thus, probe head assembly 150, like probe head assembly 38, is linearly positionable in the X, Y and Z directions, and rotatable about a V axis due to servo motor 168 and belt 174 linking the upper and lower pulleys. With servo motor 162, probe head assembly 150 is further capable of rotating the V axis about the W axis, such that a beam 210 of laser probe 204 can be directed parallel to any vector in three dimensional space, not just in an XZ plane.

The additional rotary axis (in this case the W axis) requires a further step in the alignment procedure. Certain alignment steps necessary to align laser beam 210 so that it intersects and is perpendicular to the V axis, are substantially similar to the steps described earlier in connection with FIGS. 7 and 8. Micrometer barrel 200 adjusts the tilt of laser beam 210 about the U axis relative to the V axis, pins 206 and 208 act upon cylinder 194 to adjust the linear position of laser beam 210 along the U axis, and rotational adjustments about the V axis are accomplished through the belt and pulleys.

In connection with laser probe head assembly 150, a further alignment need is that laser beam 210 must coincide with the W axis about which the laser probe and the frames 166, 178 and 182 are rotated by servo motor 162.

Figure 11:
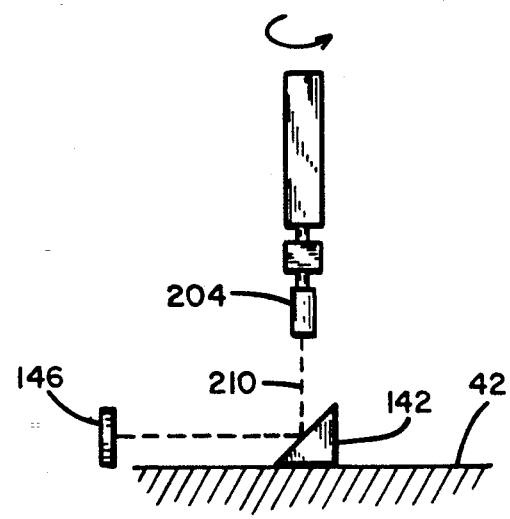
FIG. 11 is a schematic representation of alignment of the second embodiment probe assembly.

Laser beam 210 is brought into coincidence with the W axis by using micrometer barrel 180 to move the beam, along with U-shaped frame 178, relative to upper frame 166. In the course of making this adjustment, probe 204 is rotated about the W axis with beam 210 projected onto angle block 142 and reflected to scale 146 as seen FIG. 11. A properly coinciding beam remains at a point on scale 146, while an off-set beam traces a circle on the scale. With the beam thus aligned, laser probe 204 can be disposed anywhere within a three dimensional space, and oriented parallel to any vector in the three dimensional space.

Thus, in accordance with the present invention, accurate three dimensional laser scanning of objects is facilitated in that the laser probe can be positioned and oriented as desired, even in the case of fully automated scanning. Most objects with simple surface contours can be scanned with the four axis system shown in FIGS. 1–6, while complex surface topographies can be scanned with the five axis head assembly shown in FIGS. 9 and 10. In either case, the laser probe can be maneuvered to orient the laser beam at a desired, substantially perpendicular orientation with respect to the surface point or region being momentarily scanned, then quickly adjusted as necessary to maintain a favorable orientation relative to the next subsequent point of the scan. If desired, scanning can occur entirely through movement of the laser probe, so that the object under scan may be held stationary, affording greater accuracy and a substantial handling advantage in the case of either fragile or elastically deformable objects.

What is claimed is:

1. An apparatus for supporting a laser for controlled translation and rotation, including:
   a stationary base having a reference surface defining a reference plane;
   a rigid support member, and means for mounting the rigid support member for linear translation in mutually perpendicular first, second and third directions relative to the reference plane, with said third direction being perpendicular to said reference plane;
   a laser mounting means for adjustably securing a laser energy source with respect to the rigid support member, said laser mounting means including:
   a. a rigid laser support means integral with the laser energy source;
   b. a rigid first frame means, and a first coupling means for joining the laser support means to the first frame means for pivotal movement relative to the first frame means on a first adjustment axis parallel to the reference plane and for linear translation relative to the first frame means along the first adjustment axis;
   c. a second coupling means for joining the first frame means for rotation relative to the rigid support member about a first rotational axis parallel to the reference plane; and
   d. a first adjustment means for adjustably fixing the linear position of the rigid laser support means relative to the first frame means, and a second adjustment means for adjustably fixing the angular position of the rigid laser support means relative to the first frame means; and
   a first drive means for controllably moving the support member in the first, second and third directions, and a second drive means for rotating the first frame means relative to said support member.

2. The apparatus of claim 1 wherein:
said first rotation axis is perpendicular to the first adjustment axis.

3. The apparatus of claim 2 wherein:
said first frame means includes a substantially flat support plate having a major plane at least approximately perpendicular to the first rotational axis.

4. The apparatus of claim 3 wherein:
said rigid laser support means includes a substantially flat pivot plate spaced apart from the support plate in the direction of the first rotational axis and at least approximately parallel to the support plate.

5. The apparatus of claim 4 wherein:
said first coupling means includes a first channel means in the support plate and extended in the direction of the first adjustment axis, a second channel means in the pivot plate, a plurality of bearings conforming to the profiles of the first and second channel means, and a biasing means for urging the support plate and the pivot plate toward one another to maintain the bearings within the first and second channel means.

6. The apparatus of claim 5 wherein:
said bearings are spherical, the first channel means includes two elongate and spaced apart first channels, the second channel means includes two hemispherical channels, each being opposed to one of the first channels, and wherein the biasing means includes at least one spring in tension and joined to the support plate and to the pivot plate.

7. The apparatus of claim 5 wherein:
said first adjustment means includes an elongate rod parallel to the first adjustment axis, threadedly engaged with the pivot plate and engaged with the support plate and thereby rotatable to move the pivot plate linearly relative to the support plate.

8. The apparatus of claim 7 wherein:
said second adjustment means includes an elongate pin threadedly engaged within the support plate and extending in the direction of the first rotational axis toward the pivot plate to engage the pivot plate, and a spring means for biasing the support plate and the pivot plate angularly towards one another.

9. The apparatus of claim 2 wherein:
the laser mounting means further includes a third coupling means for joining the first frame means to the rigid support member for linear translation relative to the support member along a second adjustment axis parallel to the reference plane and perpendicular to the first adjustment axis, a third adjustment means for adjustably fixing the linear position of the first frame means relative to the rigid support member along the second adjustment axis, and a fourth coupling means for joining the first frame means for rotation relative to the support member about a second rotational axis perpendicular to the reference plane.

10. The apparatus of claim 9 further including:
a third drive means for rotating the first frame means relative to the support member about the second rotational axis.

11. The apparatus of claim 10 wherein:
said first coupling means includes an elongate cylinder integral with the rigid laser support means and mounted to the first frame means extended along said first adjustment axis, said cylinder being slidable relative to the first frame means along the first adjustment axis and rotatable relative to the first frame means about the first adjustment axis.

12. The apparatus of claim 11 wherein:
the first coupling means further includes a block surrounding the cylinder and slidably engaged but rotatably fixed relative to the cylinder, said block being rotatable about the first adjustment axis relative to the first frame means; wherein the first adjustment means includes means for adjustably fixing the linear position of the cylinder within the block; and the second adjustment means includes a micrometer for adjustably fixing the angular position of the block relative to the first frame means.

13. The apparatus of claim 10 wherein:
said third coupling means includes a second frame means rotatably coupled to the rigid support member by the fourth coupling means, and a third frame means supporting the first frame means and slidably coupled to the second frame means along a second adjustment axis parallel to the reference plane.

14. The apparatus of claim 13 wherein:
said second adjustment axis is perpendicular to the first adjustment axis.

15. The apparatus of claim 14 wherein:
the third adjustment means includes a means for adjustably fixing the linear position of the third frame means relative to the second frame means.

16. The apparatus of claim 14 wherein:
the third frame means is constrained against rotation relative to the second frame means, and said second coupling means comprises means for supporting the first frame means rotatably about the first rotation axis relative to the third frame means.

17. The apparatus of claim 16 wherein:
the second drive means is mounted to the second frame means, and the second coupling means includes a belt driveably engaged with the second drive means and the first frame means.

* * * * *